(12) United States Patent
Sharma et al.

(10) Patent No.: US 12,384,399 B2
(45) Date of Patent: Aug. 12, 2025

(54) FLOODWATER RISK ASSESSMENT SYSTEM FOR A VEHICLE

(71) Applicant: GM Global Technology Operations LLC, Detroit, MI (US)

(72) Inventors: Manoj Kumar Sharma, Troy, MI (US); Joseph F. Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 265 days.

(21) Appl. No.: 18/358,241

(22) Filed: Jul. 25, 2023

(65) Prior Publication Data

US 2025/0033658 A1 Jan. 30, 2025

(51) Int. Cl.
*B60W 50/14* (2020.01)
*B60K 35/00* (2006.01)
(Continued)

(52) U.S. Cl.
CPC ............. *B60W 50/14* (2013.01); *B60K 35/00* (2013.01); *B60Q 1/545* (2022.05); *B60W 40/02* (2013.01);
(Continued)

(58) Field of Classification Search
CPC .. B60W 50/14; B60W 40/02; B60W 2555/20; B60W 2050/146; B60W 2420/403; B60W 2420/406; G06V 20/588; B60Q 1/545; B60K 35/00; B60K 2360/178; B60K 2360/785; B60K 35/28;
(Continued)

(56) References Cited

U.S. PATENT DOCUMENTS

2015/0046071 A1\* 2/2015 Clarke ............ B60W 30/18018
701/112
2016/0196656 A1 7/2016 Cund et al.
(Continued)

FOREIGN PATENT DOCUMENTS

DE 102018112269 A1 11/2018

OTHER PUBLICATIONS

Mitchell, Steven, et al. "Polarization lidar for shallow water depth measurement", Applied Optics, vol. 49, No. 36 (2010): 6995-7000.
(Continued)

*Primary Examiner* — Naomi J Small
(74) *Attorney, Agent, or Firm* — Vivacqua Crane, PLLC (57) ABSTRACT

A floodwater risk assessment system for a vehicle includes one or more cameras oriented to collect image data of floodwater located along a roadway the vehicle is traveling along, a time-of-flight sensor system that directs a laser beam towards a plurality of target points disposed along the floodwater one or more controllers in electronic communication with the one or more cameras and the time-of-flight sensor system. The one or more controllers execute instructions to determine a risk associated with crossing the floodwater at each of the plurality of target points located along the floodwater based on a flow speed of the floodwater and a floodwater depth. The one or more controllers generate a notification indicating the risk associated with crossing the floodwater at the plurality of target points located along the floodwater.

20 Claims, 4 Drawing Sheets

(51) Int. Cl.
*B60Q 1/50* (2006.01)
*B60W 40/02* (2006.01)
*G01N 21/39* (2006.01)
*G06V 20/56* (2022.01)
*B60K 35/23* (2024.01)
*B60K 35/28* (2024.01)
*B60K 35/29* (2024.01)
*B60K 35/60* (2024.01)

(52) U.S. Cl.
CPC ............ *G01N 21/39* (2013.01); *G06V 20/588* (2022.01); *B60K 35/23* (2024.01); *B60K 35/28* (2024.01); *B60K 35/29* (2024.01); *B60K 35/60* (2024.01); *B60K 2360/177* (2024.01); *B60K 2360/178* (2024.01); *B60K 2360/1868* (2024.01); *B60K 2360/188* (2024.01); *B60K 2360/785* (2024.01); *B60W 2050/146* (2013.01); *B60W 2420/403* (2013.01); *B60W 2420/406* (2013.01); *B60W 2555/20* (2020.02); *G01N 2021/392* (2013.01)

(58) Field of Classification Search
CPC  B60K 35/23; B60K 2360/1868; B60K 35/29; B60K 2360/188; B60K 35/60; B60K 2360/177; G01N 21/39; G01N 2021/392
USPC .......................................................... 340/438
See application file for complete search history.

(56) References Cited

U.S. PATENT DOCUMENTS

| | | |
|---|---|---|
| 2019/0005727 A1 | 1/2019 | Tanaka et al. |
| 2020/0189463 A1 | 6/2020 | Kunz et al. |
| 2021/0101601 A1* | 4/2021 | Datta Gupta ......... B60W 10/10 |
| 2022/0171064 A1 | 6/2022 | Thayer et al. |
| 2024/0308534 A1* | 9/2024 | Sharma ................ G06V 20/588 |

OTHER PUBLICATIONS

Shah, Syed Muzzamil, "Experimental studies on the threshold of vehicle instability in floodwaters", Jurnal Teknologi, vol. 80, No. 5 (Jun. 14, 2018).
U.S. Appl. No. 18/183,403, filed Mar. 14, 2023.
Wu, Heng, et al."Measuring surface velocity of water flow by dense optical flow method", Water, No. 11 (Nov. 2019): 2320.

* cited by examiner

FLOODWATER RISK ASSESSMENT SYSTEM FOR A VEHICLE

INTRODUCTION

The present disclosure relates to a floodwater risk assessment system for a vehicle that determines floodwater depth along a roadway and creates a notification indicating a risk associated with crossing the floodwater by the vehicle based on the floodwater depth and flow speed.

Sometimes a roadway may become flooded due to inclement weather conditions such as, for example, a powerful storm. It is to be appreciated that even relatively shallow floodwater may create complications when a vehicle attempts to cross a flooded roadway. Furthermore, the floodwater depth is not always apparent to drivers. For example, about fifteen centimeters (approximately six inches) of floodwater located along a roadway may reach the bottom of many passenger cars, which may cause a loss of control and stalling. Moreover, about thirty centimeters (approximately one foot) of floodwater may cause many vehicles to float away. However, there are no systems currently available for informing a driver when the floodwater is deep enough to create issues such as a loss of control or stalling.

Thus, while current vehicles achieve their intended purpose, there is a need in the art for an approach that indicates the depth of floodwater located along a roadway.

SUMMARY

According to several aspects, a floodwater risk assessment system for a vehicle is disclosed, and includes one or more cameras oriented to collect image data of floodwater located along a roadway the vehicle is traveling along, a time-of-flight sensor system that directs a laser beam towards a plurality of target points disposed along the floodwater, and one or more controllers in electronic communication with the one or more cameras and the time-of-flight sensor system. The time-of-flight sensor system receives polarized backscattered laser light as the laser beam reflects from an upper surface of the floodwater and depolarized backscattered laser light as the laser beam reflects from a floor of the floodwater. The one or more controllers execute instructions to estimate a flow speed of the floodwater at the plurality of target points by analyzing the image data collected by the one or more cameras based on one or more video-based motion estimation algorithms. The one or more controllers calculate a floodwater depth at the plurality of target points based on a time-of-flight difference between a first point in time when the polarized backscattered laser light is received by the time-of-flight sensor system and a second point in time when the depolarized backscattered laser light is received by the time-of-flight sensor system. The one or more controllers determine a risk associated with crossing the floodwater at each of the plurality of target points located along the floodwater based on the flow speed of the floodwater and the floodwater depth. The one or more controllers generate a notification indicating the risk associated with crossing the floodwater at the plurality of target points located along the floodwater.

In another aspect, the floodwater risk assessment system further comprises an augmented reality head-up display system in electronic communication with the one or more controllers, where the augmented reality head-up display includes a graphic projection device that generates images upon a windscreen of the vehicle.

In yet another aspect, the one or more controllers execute instructions to instruct graphic projection device of the augmented reality head-up display system to generate a graphic upon the windscreen of the vehicle, where the graphic represents the notification indicating the risk associated with crossing the floodwater.

In an aspect, the graphic is a color-coded bar overlaid upon the floodwater.

In another aspect, the color-coded bar includes a plurality of individual sections that each correspond to one of the plurality of target points.

In yet another aspect, individual sections of the color-coded bar are assigned red to provide a warning indicating the risk of crossing is unacceptable at the corresponding target point.

In an aspect, the time-of-flight sensor system includes a pulsed illumination source and a fiber optic cable.

In another aspect, the pulsed illumination source generates a laser beam received by the fiber optic cable, wherein the laser beam exits a tip of the fiber optic cable.

In yet another aspect, the time-of-flight sensor system includes an actuation element that directs the laser beam emitted by the tip of the fiber optic cable towards one of the plurality of target points disposed along the floodwater.

In an aspect, the time-of-flight sensor system includes a first detector, a second detector, and a polarizing beam splitter, where the polarizing beam splitter separates the polarized backscattered laser light and the depolarized backscattered laser light, and the polarized backscattered laser light is received by the first detector and the depolarized backscattered laser light is received by the second detector.

In another aspect, the one or more controllers store one or more lookup tables that provide a combined depth and velocity value that represents a product of the flow speed of the floodwater and the floodwater depth.

In yet another aspect, the one or more controllers execute instructions to compare a combined depth and velocity value corresponding to a specific one of the plurality of target points along the floodwater with a threshold vehicle instability value, and in response to determining the combined depth and velocity value is less than the threshold vehicle instability value, determine the risk of crossing the floodwater at a specific target point is acceptable. The threshold vehicle instability value is a function of one or more vehicle parameters.

In an aspect, the threshold vehicle instability value is determined based on the following equation:

$$v = 2\sqrt{\frac{F_r}{\rho C_D A_{tyre} D}}$$

where v represents the flow speed of the floodwater at the threshold vehicle instability value, $F_r$ represents a restoring force at an axle of the vehicle, $\rho$ represents a density of water, $C_D$ represents a coefficient of drag of the vehicle, $A_{tyre}$ represents an area of tires that are part of the vehicle that are in contact with the ground, and D represents the floodwater depth.

In another aspect, the floodwater risk assessment system further includes an illumination device in electronic communication with the one or more controllers, wherein the illumination device projects a light beam onto a surface of the floodwater and the light beam is oriented parallel to a direction of travel of the vehicle.

In yet another aspect, the one or more controllers determine a presence of road damage located underneath the floodwater based on a plurality of images captured by the one or more cameras, wherein the plurality of images are representative of the light beam projected by the illumination device along the floodwater.

In an aspect, the one or more controllers determine the risk of crossing the floodwater at a specific target point is unacceptable in response to determining the presence of road damage at the specific target point.

In another aspect, a method for generating a notification by a floodwater risk assessment system for a vehicle. The method includes receiving, by one or more controllers, image data of floodwater located along a roadway the vehicle is traveling along collected by one or more cameras. The method includes estimating, by the one or more controllers, a flow speed of the floodwater at a plurality of target points located along the floodwater by analyzing the image data collected by the one or more cameras based on one or more video-based motion estimation algorithms. The method also includes calculating a floodwater depth at the plurality of target points based on a time-of-flight difference between a first point in time when polarized backscattered laser light is received by a time-of-flight sensor system and a second point in time when depolarized backscattered laser light is received by the time-of-flight sensor system, where the time-of-flight sensor system directs a laser beam towards the plurality of target points disposed along the floodwater and receive the polarized backscattered laser light as the laser beam reflects from an upper surface of the floodwater and the depolarized backscattered laser light as the laser beam reflects from a floor of the floodwater. The method also includes determining a risk associated with crossing the floodwater at each of the plurality of target points located along the floodwater based on the flow speed of the floodwater and the floodwater depth. The method also includes generating a notification indicating the risk associated with crossing the floodwater at the plurality of target points located along the floodwater.

In another aspect, a floodwater risk assessment system for a vehicle is disclosed and includes one or more cameras oriented to collect image data of floodwater located along a roadway the vehicle is traveling along, a time-of-flight sensor system that direct a laser beam towards a plurality of target points disposed along the floodwater, an augmented reality head-up display system including a graphic projection device that generates images upon a windscreen of the vehicle, and one or more controllers in electronic communication with the one or more cameras, the time-of-flight sensor system, and the augmented reality head-up display. The time-of-flight sensor system receives polarized backscattered laser light as the laser beam reflects from an upper surface of the floodwater and depolarized backscattered laser light as the laser beam reflects from a floor of the floodwater. The one or more controllers execute instructions to estimate a flow speed of the floodwater at the plurality of target points by analyzing the image data collected by the one or more cameras based on one or more video-based motion estimation algorithms. The one or more controllers calculate a floodwater depth at the plurality of target points based on a time-of-flight difference between a first point in time when the polarized backscattered laser light is received by the time-of-flight sensor system and a second point in time when the depolarized backscattered laser light is received by the time-of-flight sensor system. The one or more controllers determine a risk associated with crossing the floodwater at each of the plurality of target points located along the floodwater based on the flow speed of the floodwater and the floodwater depth. The one or more controllers instruct the graphic projection device of the augmented reality head-up display system to generate a graphic upon the windscreen of the vehicle, where the graphic represents a notification indicating the risk associated with crossing the floodwater at the plurality of target points located along the floodwater.

In another aspect, the graphic is a color-coded bar overlaid upon the floodwater.

In yet another aspect, the color-coded bar includes a plurality of individual sections that each correspond to one of the plurality of target points.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
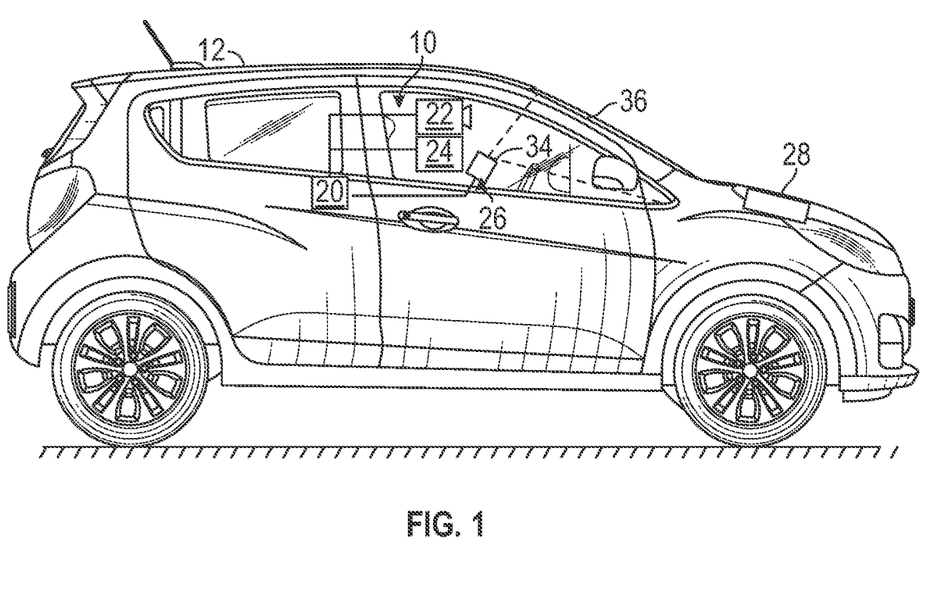
FIG. 1 is a schematic diagram of a vehicle including the disclosed floodwater risk assessment system including one or more controllers in electronic communication with a time-of-flight sensor system and an augmented reality head-up display system, according to an exemplary embodiment.

Referring to FIG. 1, an exemplary floodwater risk assessment system 10 for a vehicle 12 is illustrated. It is to be appreciated that the vehicle 12 may be any type of vehicle such as, but not limited to, a sedan, truck, sport utility vehicle, van, or motor home. The floodwater risk assessment system 10 includes one or more controllers 20 in electronic communication with one or more cameras 22, one or more time-of-flight sensor system 24, an augmented reality head-up display system 26, and an illumination device 28. As explained below, the floodwater risk assessment system 10 determines a depth of floodwater 40 (shown in FIG. 2A) located along the roadway 42 the vehicle 12 is traveling along and creates a notification 44 (shown in FIG. 2B) that indicates a risk of crossing the floodwater 40 based on the floodwater depth.

The one or more cameras 22 are oriented to collect image data of an environment located in front of the vehicle 12. It is to be appreciated that the image data refers to both images and video representing the environment surrounding the vehicle 12. The time-of-flight sensor system 24 is oriented to face the front of the vehicle 12. Some examples of the time-of-flight sensor system 24 include, but are not limited to, LiDAR and single-photon avalanche diode (SPAD) sensors. The augmented reality head-up display system 26 includes a graphic projection device 34 configured to generate images upon a windscreen 36 of the vehicle 12. The graphic projection device 34 includes a projection device having an excitation light for projecting images upon the windscreen 36 of the vehicle 12. Some examples of the projection device include, but are not limited to, optical collimators, laser projectors, and digital light processing projectors (DLP). The illumination device 28 is any type of illumination device that projects a light beam onto a surface of the floodwater 40 (shown in FIG. 2A) in front of the vehicle 12, where the light beam is oriented parallel to a direction of travel of the vehicle 12. For example, in one non-limiting embodiment, the illumination device 28 is a laser line projector including a laser diode, a collimating lens, and a line generating optic.

Figure 2A:
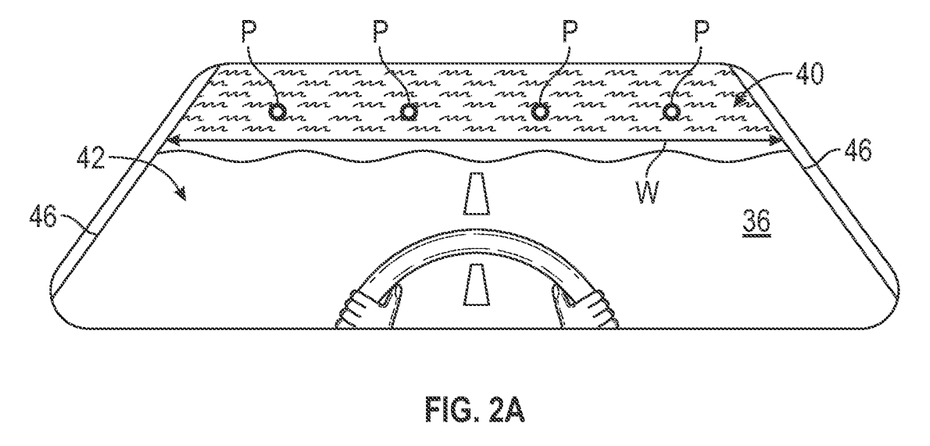
FIG. 2A illustrates a driver viewing the floodwater disposed along the roadway through a windscreen of the vehicle according to an exemplary embodiment.
Figure 2B:
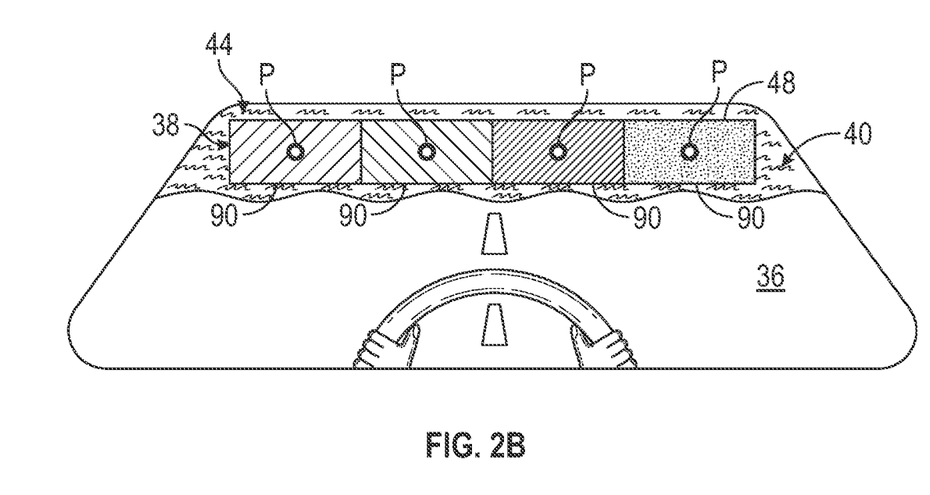
FIG. 2B illustrates a notification that is projected by the augmented reality head-up display system shown in FIG. 1, according to an exemplary embodiment.

Referring to FIGS. 1, 2A, and 2B, the floodwater risk assessment system 10 determines a floodwater depth of the floodwater 40 (shown in FIG. 2A) located along the roadway 42 the vehicle 12 is traveling along. The floodwater risk assessment system 10 also creates the notification 44 (shown in FIG. 2B) that indicates a risk of crossing the floodwater 40 based on the floodwater depth. In the example as shown in FIG. 2B, a graphic 38 generated by the graphic projection device 34 of the augmented reality head-up display system 26 that is displayed upon the windscreen 36 of the vehicle 12 represents the notification 44. Specifically, in the example as shown in FIG. 2B, the graphic 38 is a color-coded bar 48 that is overlaid upon the floodwater 40 located along the roadway 42. As explained below, the color-coded bar 48 indicates which areas of the floodwater 40 are acceptable or unacceptable for the vehicle 12 to cross, where a warning is provided to indicate the areas of the floodwater 40 that are unacceptable to cross. Specifically, as explained below, individual sections 90 of the color-coded bar 48 are colored red to provide a warning indicating the risk of crossing to floodwater 40 is unacceptable. Although FIG. 2B illustrates the notification 44 as a graphic 38 that is displayed upon the windscreen 36, it is to be appreciated that the notification 44 is not limited to a graphic generated by an augmented reality head-up display. For example, in another embodiment, the notification 44 may be voice instructions that inform the occupants of the vehicle 12 not to cross the floodwater. Indeed, it is to be appreciated that although an augmented reality head-up display system 26 is illustrated in the figures, the notification 44 may be generated by any type of or driver information system.

Figure 3:
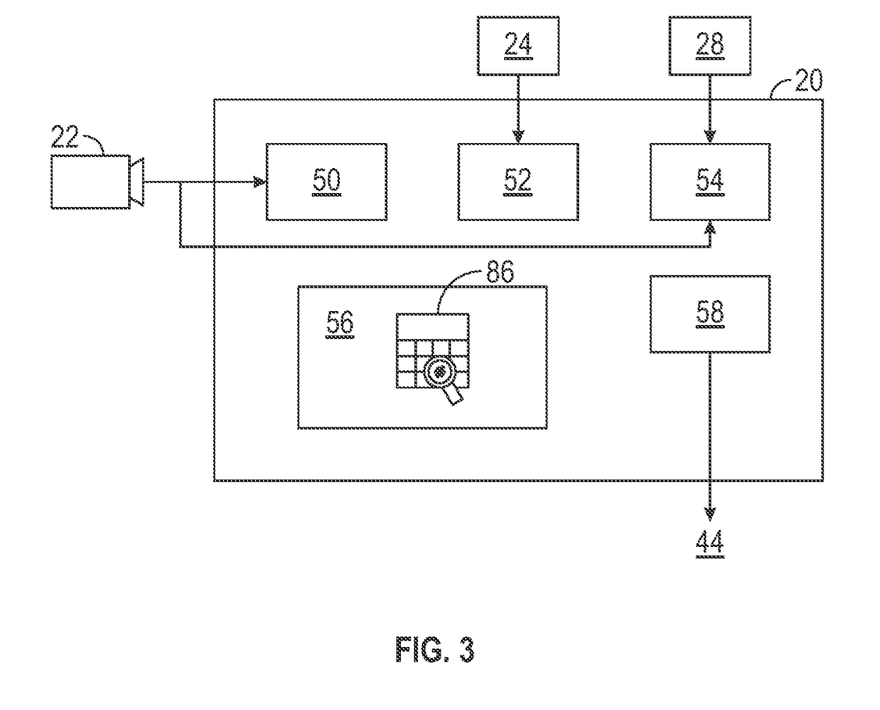
FIG. 3 is a diagram illustrating the software architecture of the one or more controllers shown in FIG. 1, according to an exemplary embodiment.

FIG. 3 is a diagram illustrating the software architecture of the one or more controllers 20 shown in FIG. 1. Referring to FIGS. 1, 2A, and 3, the one or more controllers 20 include a flow speed module 50 that estimate a flow speed of the floodwater 40 located along the roadway 42, a depth assessment module 52 that calculates the floodwater depth, a road damage module 54 to detect road damage located underneath the floodwater 40, a risk assessment module 56 that determines which areas of the floodwater 40 are acceptable or unacceptable for the vehicle 12 to cross, and a notification module 58 that instructs the graphic projection device 34 of the augmented reality head-up display system 26 generates the graphic 38 upon the windscreen 36 of the vehicle 12.

Continuing to refer to FIGS. 1, 2A, and 3, the one or more cameras 22 are oriented to collect image data of the floodwater 40 located along the roadway 42, where the image data is received by the one or more controllers 20. The flow speed module 50 of the one or more controllers 20 estimates the flow speed of the floodwater 40 at the plurality of target points P by analyzing the image data collected by the one or more cameras 22 based on one or more video-based motion estimation algorithms. One example of a video-based motion estimation technique is the dense optical flow (DOF) algorithm, however, it is to be appreciated that other approaches may be used as well. In one specific embodiment, the Farneback optical flow method (FOFM), which is a DOF algorithm, calculates a surface velocity of water flow (SVWF) of the floodwater 40 at one of the target points P (FIG. 2A) between two successive frames that are part of the image data collected by the one or more cameras 22.

Referring specifically to FIGS. 2A and 3, the flow speed module 50 of the one or more controllers 20 estimates the flow speed of the floodwater 40 at the plurality of target points P located along a width W of the floodwater 40, where the width W extends between the opposing lane edges 46 of the roadway 42. It is to be appreciated that the flow speed of the floodwater 40 may vary at different locations along the floodwater 40, and therefore the flow speed of the floodwater 40 is determined at multiple points along the floodwater 40 to capture the flow speed.

Figure 4:
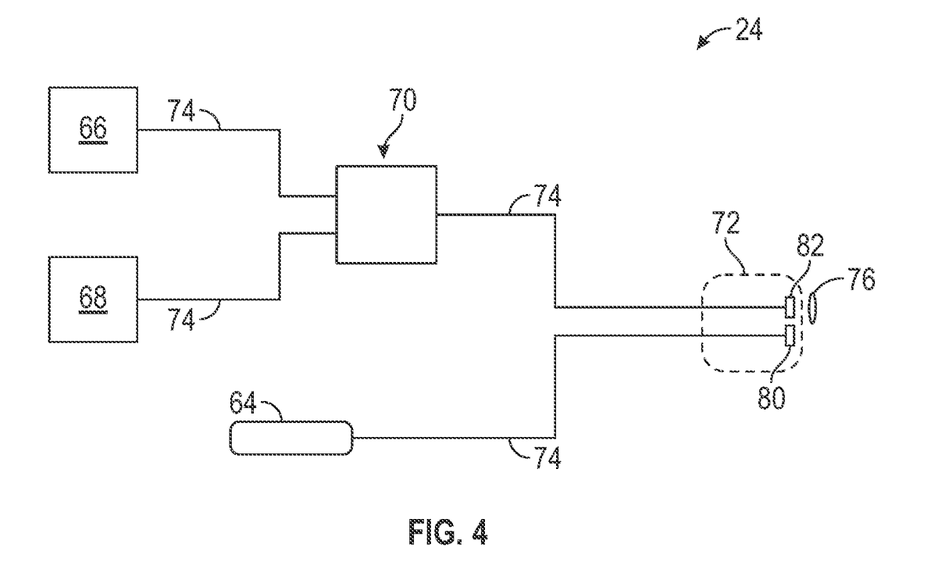
FIG. 4 is a schematic diagram of the time-of-flight sensor system shown in FIG. 1, according to an exemplary embodiment.

FIG. 4 is a schematic diagram of an exemplary time-of-flight sensor system 24. As mentioned above, the time-of-flight sensor system 24 may be, for example, LiDAR, a photon multiplier tube (PMT) in photon counting mode, or a single-photon avalanche diode (SPAD) sensor. The time-of-flight sensor system 24 includes a pulsed illumination source 64, a first detector 66, a second detector 68, a polarizing beam splitter 70, an actuation element 72, a fiber optic cable 74, and an imaging lens 76. It is to be appreciated that in embodiments the first detector 66 and the second detector 68 may be time-sensitive photon counters, and the polarized beam splitter 70 may be a polarization sensitive fiber combiner/splitter. The pulsed illumination source 64 of the time-of-flight sensor system 24 generates a laser beam that is received by the fiber optic cable 74, where the laser beam is horizontally polarized. The laser beam exits a tip 80 of the fiber optic cable 74 and is directed towards the floodwater 40 located along the roadway 42. Specifically, the actuation element 72 directs the laser beam emitted by the tip 80 of the fiber optic cable 74 towards one of the plurality of target points P disposed along the width W of the floodwater 40. The actuation element 72 is any type of actuator that moves the tip 80 of the fiber optic cable 74 to scan the floodwater 40 at the target points P. For example, in one embodiment, the actuation element 72 is a piezoelectric actuator that moves in response to voltage being applied. Polarized backscattered laser light reflects from an upper surface of the floodwater 40 and depolarized backscattered laser light reflects from a floor (i.e., the surface of the roadway 42) of the floodwater 40. It is to be appreciated that the depolarized backscattered laser light includes randomly polarized light as well.

The light reflected from the upper surface of the floodwater 40 includes a different polarization state from the light reflected from the floor of the floodwater 40. Specifically, the polarized backscattered laser light and the depolarized backscattered laser light are both directed towards the imaging lens 76 of the time-of-flight sensor system 24. The imaging lens 76 directs the polarized backscattered laser light and the depolarized backscattered laser light towards an end 82 of the fiber optic cable 74 and is received by the polarizing beam splitter 70. The polarizing beam splitter 70 separates the polarized backscattered laser light and the depolarized backscattered laser light, where the polarized backscattered laser light is received by the first detector 66 and the depolarized backscattered laser light is received by the second detector 68. It is to be appreciated that the returning photons associated with the polarized backscattered laser light and the depolarized backscattered laser light are time flagged by the detectors 66, 68, and is used to calculate a time-of-flight difference as explained below.

Referring to FIGS. 2A, 3 and 4, the depth assessment module 52 of the one or more controllers 20 calculates the depth of the floodwater 40 at each target point P located along the roadway 42 based on the time-of-flight difference between a first point in time when the polarized backscattered laser light is received by the first detector 66 and a second point in time when the depolarized backscattered laser light is received by the second detector 68. It is to be appreciated that the depth of the floodwater 40 measured by the time-of-flight sensor system 24 is oriented at an angle, and the depth of the floodwater 40 calculated by the depth assessment module 52 is adjusted to reflect the vertical depth.

Referring to FIGS. 1 and 2A, the road damage module 54 of the one or more controllers 20 determines the presence of road damage located underneath the floodwater 40 based on a plurality of images captured by the one or more cameras 22, where the plurality of images are representative of the light beam projected by the illumination device 28 along the floodwater 40. A method of determining the presence of road damage is described in U.S. application Ser. No. 18/183,403 filed on Mar. 14, 2023, which is incorporated by reference in its entirety.

Referring to FIGS. 1, 2A, and 3, the road damage module 54 of the one or more controllers 20 determines the presence of road damage located underneath the floodwater 40 by instructing the illumination device 28 to project the light beam onto the floodwater 40 in front of the vehicle 12. The light beam is a line-shaped beam of light projected onto the floodwater 40 in front of the vehicle 12. It is to be appreciated that when the light beam is projected on a flat roadway surface or floodwater, the light beam appears approximately linear (i.e., a straight line). However, when projected on an irregular roadway surface or floodwater (e.g., a roadway surface with a deformation, such as, for example, a pothole), the light beam is distorted and does not appear as a straight line.

The one or more cameras 22 capture the plurality of images representative of the light beam projected by the illumination device 28 along the floodwater 40. The road damage module 54 of the one or more controllers 20 binarizes the plurality of images representative of the light beam captured by the one or more cameras 22 to create binary image data that includes a measured light beam. The measured light beam of the binary image data is compared with a reference light beam to determine a plurality of deformation values that quantify how much the measured light beam deviates from the reference light beam. The road damage module 54 of the one or more controllers 20 determines a plurality of deformation values that represent the deviation between the measured light beam and the reference light beam, where a severity of a deformation in the roadway surface is determined based on the plurality of deformation values.

The road damage module 54 then compares the severity of the deformation with a threshold deformation value, where the threshold deformation value represents road damage that would materially affect the depth of the floodwater 40. In response to determining the severity of the deformation is greater than the threshold deformation value, the road damage module 54 determines the presence of road damage underneath the floodwater 40.

Referring to FIGS. 1, 2A, and 3, the risk assessment module 56 of the one or more controllers 20 determine the risk of crossing the floodwater 40 at each of the plurality of target points P located along the floodwater 40, where the risk of crossing is based on the flow speed of the floodwater determined by the flow speed module 50, the floodwater depth determined by the depth assessment module 52, and the presence of road damage underneath the floodwater 40 determined by the road damage module 54. The risk of crossing indicates which areas of the floodwater 40 are acceptable or unacceptable for the vehicle 12 to cross.

The risk assessment module 56 stores one or more lookup tables 86 in memory of the one or more controllers 20. The one or more lookup tables 86 provide a combined depth and velocity value that represents a product of the flow speed of the floodwater 40 and the floodwater depth that are measured at a specific one of the target points P. The risk assessment module 56 compares the combined depth and velocity value corresponding to a specific one of the plurality of target points P along the floodwater 40 (FIG. 2A) with a threshold vehicle instability value. In response to determining the combined depth and velocity value is less than the threshold vehicle instability value, the risk assessment module 56 of the one or more controllers 20 determines the risk of crossing the floodwater 40 at the specific target point P is acceptable. In an embodiment, the risk assessment module 56 may determine a level of acceptable risk, where more shallow areas of the floodwater 40 are assigned a lower level of risk. In response to determining the combined depth and velocity value is less than the threshold vehicle instability value, the risk assessment module 56 of the one or more controllers 20 determines the risk of crossing the floodwater 40 at the specific target point P is unacceptable. The risk assessment module 56 also determines the risk of crossing the floodwater 40 is unacceptable at any areas where the presence of road damage located underneath the floodwater 40 was determined by the road damage module 54.

The threshold vehicle instability value is indicative of the vehicle 12 losing overall stability. It is to be appreciated that the threshold vehicle instability value is a function of one or more vehicle parameters. The vehicle parameters refer to the size and the weight of the vehicle 12, and include measurements such as, for example, the height of the vehicle 12 and the wheelbase. It is to be appreciated that the overall stability refers to floating instability, sliding instability, and toppling instability of a vehicle. The threshold vehicle instability value varies based on the type of vehicle, where larger vehicles such as a van or truck have a higher threshold vehicle instability value when compared to smaller vehicles, such as a sedan. In one embodiment, the threshold vehicle instability value is determined based on the following equation:

$$v = 2\sqrt{\frac{F_r}{\rho C_D A_{tyre} D}}$$

where v represents the flow speed of the floodwater 40 at the threshold vehicle instability value, $F_r$ represents a restoring force at the axle of the vehicle 12, ρ represents the density of water, $C_D$ represents the coefficient of drag of the vehicle 12 (which is 1.1 when the floodwater level is below the vehicle chassis and 1.15 when the floodwater level is above the vehicle chassis) $A_{tyre}$ represents an area of the tires of the vehicle 12 in contact with the ground, and D represents the floodwater depth.

Referring to FIGS. 1, 2A, 2B, and 3, the notification module 58 of the one or more controllers 20 generates the notification 44 indicating the risk of crossing the floodwater 40 at the plurality of target points P located along the floodwater 40. As mentioned above, although FIG. 2B illustrates the notification 44 as a graphic 38 generated by the augmented reality head-up display system 26, it is to be appreciated that FIG. 2B is merely exemplary in nature. In the example as shown in FIG. 2B, the graphic 38 is a color-coded bar 48 overlaid upon the floodwater 40. The color-coded bar 48 includes a plurality of individual sections 90 that each correspond to one of the plurality of target point P. Each individual section 90 of the color-coded bar 48 is assigned a color that indicates the risk of crossing the floodwater 40 at the corresponding target point P. It is to be appreciated that the notification 44 may also provide a warning to the occupants of the vehicle 12 in the event the risk associated with crossing the floodwater 40 is unacceptable. For example, individual sections 90 of the color-coded bar 48 that are assigned red provide a warning indicating the risk of crossing is unacceptable, while individual sections 90 of the color-coded bar 48 that are green indicate the risk of crossing is acceptable. In an embodiment, the individual sections 90 of the color-coded bar 48 are assigned different shades of green to indicate varying levels of acceptable risk.

Figure 5:
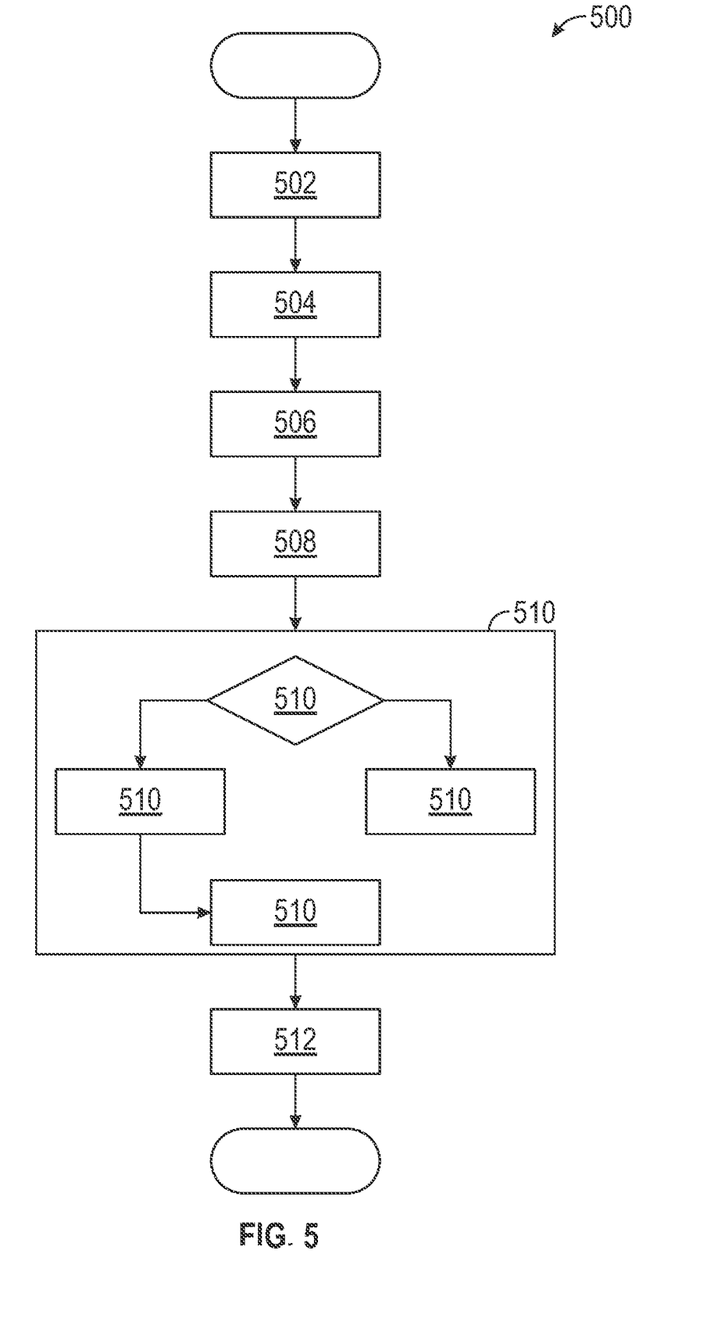
FIG. 5 is a process flow diagram illustrating a method for generating a notification by the floodwater risk assessment system indicating the risk of crossing the floodwater, according to an exemplary embodiment.

FIG. 5 is a process flow diagram illustrating a method 500 for generating the notification 44 by the floodwater risk assessment system 10. Referring to FIG. 1-5, the method 500 begins at block 502. In block 502, the one or more controllers 20 receive image data of the floodwater 40 located along the roadway 42 (FIG. 2A) collected by the one or more cameras 22. The method 500 may then proceed to block 504.

In block 504, the flow speed module 50 of the one or more controllers 20 estimate the flow speed of the floodwater 40 at the plurality of target points P (FIG. 2A) by analyzing the image data collected by the one or more cameras 22 based on one or more video-based motion estimation algorithms. The method 500 may then proceed to block 506.

In block 506, the depth assessment module 52 of the one or more controllers 20 calculates the depth of the floodwater 40 at each target point P located along the roadway 42 (FIG. 2A) based on a time-of-flight difference between a first point in time when the polarized backscattered laser light is received by the first detector 66 and a second point in time when the depolarized backscattered laser light is received by the second detector 68 of the time-of-flight sensor system 24 (FIG. 4). The method 500 may then proceed to block 508.

In block 508, the road damage module 54 of the one or more controllers 20 determines the presence of road damage located underneath the floodwater 40 based on a plurality of images captured by the one or more cameras 22, where the plurality of images are representative of the light beam projected by the illumination device 28 along the floodwater 40. The method 500 may then proceed to block 510.

In block 510, the risk assessment module 56 of the one or more controllers 20 determine the risk of crossing the floodwater 40 at each of the plurality of target points P located along the floodwater 40, where the risk of crossing is based on the flow speed of the floodwater determined by the flow speed module 50, the floodwater depth determined by the depth assessment module 52, and the presence of road damage underneath the floodwater 40 determined by the road damage module 54.

Specifically, in decision block 510A the risk assessment module 56 of the one or more controllers 20 compares the combined depth and velocity value corresponding to a specific one of the plurality of target points P along the floodwater 40 (FIG. 2A) with the threshold vehicle instability value. In response to determining the combined depth and velocity value is less than the threshold vehicle instability value, the method proceeds to block 510B, and the risk assessment module 56 of the one or more controllers 20 determines the risk of crossing the floodwater 40 at the specific target point P is acceptable. In response to determining the combined depth and velocity value is less than the threshold vehicle instability value, the method 500 proceeds to block 510C, and the risk assessment module 56 of the one or more controllers 20 determines the risk of crossing the floodwater 40 at the specific target point P is unacceptable. In the event the risk is determined as acceptable in block 510B, the method 500 may then proceed to block 510D. In block 510D, the risk assessment module 56 determines the risk of crossing the floodwater 40 at a specific target point P is unacceptable in response to determining the presence of road damage at the specific target point P by the road damage module 54. The method 500 may then proceed to block 512.

In block 512, the notification module 58 of the one or more controllers 20 generates the notification 44 indicating the risk of crossing the floodwater 40 at the plurality of target points P located along the floodwater 40. As mentioned above, in one non-limiting embodiment the notification 44 as a graphic 38 generated by the augmented reality head-up display system 26. The method 500 may then terminate.

Referring to FIGS. 1-5, the disclosed floodwater risk assessment system provides various technical effects and benefits. It is to be appreciated that the depth of floodwater along a roadway is not always apparent, and crossing even relatively shallow floodwater may create complications for a vehicle. The disclosed floodwater risk assessment system provides an approach for determining the depth of the floodwater along multiple points along the floodwater, and for informing vehicle occupants of the risk associated with crossing the floodwater. In embodiments, the floodwater risk assessment system includes an augmented reality head-up display system that generates graphics upon a windscreen of the vehicle informing the vehicle occupants of the risk associated with crossing the floodwater at multiple locations along the width of the roadway.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A floodwater risk assessment system for a vehicle, the floodwater risk assessment system comprising:
   one or more cameras oriented to collect image data of floodwater located along a roadway the vehicle is traveling along;
   a time-of-flight sensor system that directs a laser beam towards a plurality of target points disposed along the floodwater, wherein the time-of-flight sensor system receives polarized backscattered laser light as the laser beam reflects from an upper surface of the floodwater and depolarized backscattered laser light as the laser beam reflects from a floor of the floodwater; and
   one or more controllers in electronic communication with the one or more cameras and the time-of-flight sensor system, wherein the one or more controllers execute instructions to:
      estimate a flow speed of the floodwater at the plurality of target points by analyzing the image data collected by the one or more cameras based on one or more video-based motion estimation algorithms;
      calculate a floodwater depth at the plurality of target points based on a time-of-flight difference between a first point in time when the polarized backscattered laser light is received by the time-of-flight sensor system and a second point in time when the depolarized backscattered laser light is received by the time-of-flight sensor system;
      determine a risk associated with crossing the floodwater at each of the plurality of target points located along the floodwater based on the flow speed of the floodwater and the floodwater depth; and
      generate a notification indicating the risk associated with crossing the floodwater at the plurality of target points located along the floodwater.

2. The floodwater risk assessment system of claim 1, further comprising an augmented reality head-up display system in electronic communication with the one or more controllers, wherein the augmented reality head-up display includes a graphic projection device that generates images upon a windscreen of the vehicle.

3. The floodwater risk assessment system of claim 2, wherein the one or more controllers execute instructions to:
   instruct graphic projection device of the augmented reality head-up display system to generate a graphic upon the windscreen of the vehicle, wherein the graphic represents the notification indicating the risk associated with crossing the floodwater.

4. The floodwater risk assessment system of claim 3, wherein the graphic is a color-coded bar overlaid upon the floodwater.

5. The floodwater risk assessment system of claim 4, wherein the color-coded bar includes a plurality of individual sections that each correspond to one of the plurality of target points.

6. The floodwater risk assessment system of claim 5, wherein individual sections of the color-coded bar are assigned red to provide a warning indicating the risk of crossing is unacceptable at the corresponding target point.

7. The floodwater risk assessment system of claim 1, wherein the time-of-flight sensor system includes a pulsed illumination source and a fiber optic cable.

8. The floodwater risk assessment system of claim 7, wherein the pulsed illumination source generates a laser beam received by the fiber optic cable, wherein the laser beam exits a tip of the fiber optic cable.

9. The floodwater risk assessment system of claim 8, wherein the time-of-flight sensor system includes an actuation element that directs the laser beam emitted by the tip of the fiber optic cable towards one of the plurality of target points disposed along the floodwater.

10. The floodwater risk assessment system of claim 9, wherein the time-of-flight sensor system includes a first detector, a second detector, and a polarizing beam splitter, wherein the polarizing beam splitter separates the polarized backscattered laser light and the depolarized backscattered laser light, and the polarized backscattered laser light is received by the first detector and the depolarized backscattered laser light is received by the second detector.

11. The floodwater risk assessment system of claim 1, wherein the one or more controllers store one or more lookup tables that provide a combined depth and velocity value that represents a product of the flow speed of the floodwater and the floodwater depth.

12. The floodwater risk assessment system of claim 11, wherein the one or more controllers execute instructions to:
   compare a combined depth and velocity value corresponding to a specific one of the plurality of target points along the floodwater with a threshold vehicle instability value; and
   in response to determining the combined depth and velocity value is less than the threshold vehicle instability value, determine the risk of crossing the floodwater at a specific target point is acceptable, wherein the threshold vehicle instability value is a function of one or more vehicle parameters.

13. The floodwater risk assessment system of claim 12, wherein the threshold vehicle instability value is determined based on the following equation:

$$v = 2\sqrt{\frac{F_r}{\rho C_D A_{tyre} D}}$$

wherein v represents the flow speed of the floodwater at the threshold vehicle instability value, $F_r$ represents a restoring force at an axle of the vehicle, $\rho$ represents a density of water, $C_D$ represents a coefficient of drag of the vehicle, $A_{tyre}$ represents an area of tires that are part of the vehicle that are in contact with the ground, and D represents the floodwater depth.

14. The floodwater risk assessment system of claim 1, further comprising an illumination device in electronic communication with the one or more controllers, wherein the illumination device projects a light beam onto a surface of the floodwater and the light beam is oriented parallel to a direction of travel of the vehicle.

15. The floodwater risk assessment system of claim 14, wherein the one or more controllers determine a presence of road damage located underneath the floodwater based on a plurality of images captured by the one or more cameras, wherein the plurality of images are representative of the light beam projected by the illumination device along the floodwater.

16. The floodwater risk assessment system of claim 15, wherein the one or more controllers determine the risk of crossing the floodwater at a specific target point is unacceptable in response to determining the presence of road damage at the specific target point.

17. A method for generating a notification by a floodwater risk assessment system for a vehicle, the method comprising:
- receiving, by one or more controllers, image data of floodwater located along a roadway the vehicle is traveling along collected by one or more cameras;
- estimating, by the one or more controllers, a flow speed of the floodwater at a plurality of target points located along the floodwater by analyzing the image data collected by the one or more cameras based on one or more video-based motion estimation algorithms;
- calculating a floodwater depth at the plurality of target points based on a time-of-flight difference between a first point in time when polarized backscattered laser light is received by a time-of-flight sensor system and a second point in time when depolarized backscattered laser light is received by the time-of-flight sensor system, wherein the time-of-flight sensor system directs a laser beam towards the plurality of target points disposed along the floodwater and receive the polarized backscattered laser light as the laser beam reflects from an upper surface of the floodwater and the depolarized backscattered laser light as the laser beam reflects from a floor of the floodwater;
- determining a risk associated with crossing the floodwater at each of the plurality of target points located along the floodwater based on the flow speed of the floodwater and the floodwater depth; and
- generating a notification indicating the risk associated with crossing the floodwater at the plurality of target points located along the floodwater.

18. A floodwater risk assessment system for a vehicle, the floodwater risk assessment system comprising:
- one or more cameras oriented to collect image data of floodwater located along a roadway the vehicle is traveling along;
- a time-of-flight sensor system that direct a laser beam towards a plurality of target points disposed along the floodwater, wherein the time-of-flight sensor system receives polarized backscattered laser light as the laser beam reflects from an upper surface of the floodwater and depolarized backscattered laser light as the laser beam reflects from a floor of the floodwater;
- an augmented reality head-up display system including a graphic projection device that generates images upon a windscreen of the vehicle; and
- one or more controllers in electronic communication with the one or more cameras, the time-of-flight sensor system, and the augmented reality head-up display, wherein the one or more controllers execute instructions to:
  - estimate a flow speed of the floodwater at the plurality of target points by analyzing the image data collected by the one or more cameras based on one or more video-based motion estimation algorithms;
  - calculate a floodwater depth at the plurality of target points based on a time-of-flight difference between a first point in time when the polarized backscattered laser light is received by the time-of-flight sensor system and a second point in time when the depolarized backscattered laser light is received by the time-of-flight sensor system;
  - determine a risk associated with crossing the floodwater at each of the plurality of target points located along the floodwater based on the flow speed of the floodwater and the floodwater depth; and
  - instruct the graphic projection device of the augmented reality head-up display system to generate a graphic upon the windscreen of the vehicle, wherein the graphic represents a notification indicating the risk associated with crossing the floodwater at the plurality of target points located along the floodwater.

19. The floodwater risk assessment system of claim 18, wherein the graphic is a color-coded bar overlaid upon the floodwater.

20. The floodwater risk assessment system of claim 19, wherein the color-coded bar includes a plurality of individual sections that each correspond to one of the plurality of target points.

* * * * *